United States Patent [19]
Friedline

[11] 4,083,644
[45] Apr. 11, 1978

[54] TOOL HOLDER
[75] Inventor: Ernest J. Friedline, Latrobe, Pa.
[73] Assignee: Kennametal Inc., Latrobe, Pa.
[21] Appl. No.: 784,119
[22] Filed: Apr. 4, 1977
[51] Int. Cl.² .................. B26D 1/12; B23B 29/00
[52] U.S. Cl. ................................ 407/67; 82/36 R;
407/101; 407/113
[58] Field of Search ............... 29/95 R, 96, 97;
82/36 R

[56] References Cited
U.S. PATENT DOCUMENTS

| 2,348,262 | 5/1944 | Oak et al. ................... 29/96 |
| 3,545,318 | 12/1970 | Anderson ................. 82/36 R |
| 3,545,319 | 12/1970 | Anderson et al. ........ 82/36 R |
| 3,990,443 | 9/1976 | McCreery ................... 29/97 |

FOREIGN PATENT DOCUMENTS

| 213,925 | 3/1958 | Australia ................... 29/96 |
| 639,824 | 8/1927 | France ....................... 29/96 |
| 1,917,193 | 10/1970 | Germany .................... 82/36 |

Primary Examiner—Harrison L. Hinson
Attorney, Agent, or Firm—Lawrence R. Burns

[57] ABSTRACT

A tool holder in which the holder comprises a support member with a block detachably mounted in a notch on one end of the support member and with the block having insert receiving pockets for mounting cutting inserts therein. Cooperating ribs and grooves locate the block on the support member and a clamp member carried by the support member extends upwardly through a slotted portion in the block and has a head for clampingly engaging said block.

10 Claims, 7 Drawing Figures

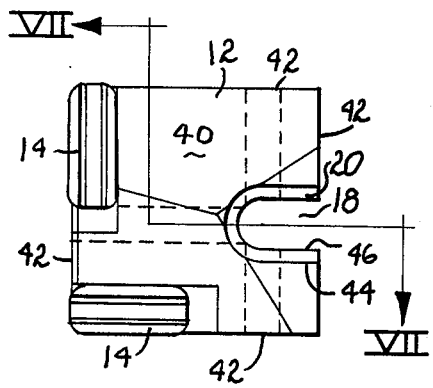
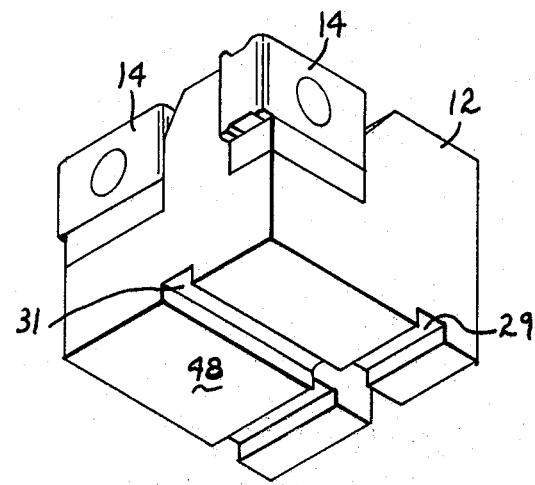
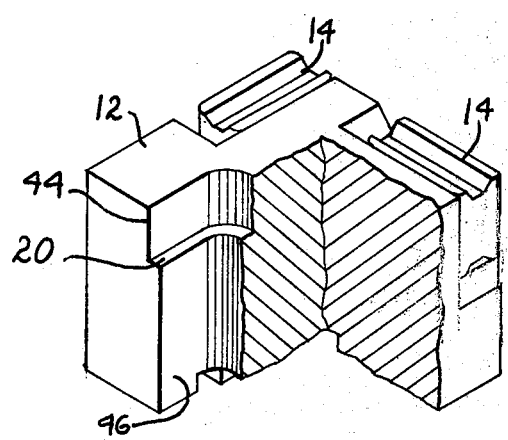

TOOL HOLDER

BACKGROUND OF THE INVENTION

The present invention relates to tool holders, and is concerned with heavy duty tool holders of the nature such as are employed for heavy turning operations and the like.

In performing heavy turning operations, cutting inserts are naturally subjected to considerable wear and abuse and require frequent indexing or replacement. At the same time, when doing heavy duty turning, considerable heat can be generated in the tool holder, especially at the cutting insert end and, more particularly still, directly in the cutting insert.

Thus, it is sometimes difficult for an operator quickly to replace a worn cutting insert when the tool has been carrying out heavy turning operations.

It is also the case that tools of the nature referred to are sometimes employed for numerically controlled machining operations and, in such cases, it is important to have the insert positioned precisely on the tool holder. Inserts can vary somewhat dimensionally, and when a machine is employed for numerically controlled machining operations, it is desirable to be able to preset the insert in a holding device externally of the machine tool and then the insert and the holding device can be placed in the machine tool in an accurate position.

The tool holder described in U.S. Pat. No. 3,980,443, and owned by the assignee, is an example of tool holders that have been designed to meet the above-mentioned needs of industry. The tool holder of the present invention has been greatly simplified with regard to either cost of manufacture, simplicity of operation, or both.

It is an object of the present invention to provide a quick change type of tool holder that is extremely simplified in operation yet very solidly constructed.

It is a further object of the present invention to provide a quick change type of tool holder that is less costly to produce.

BRIEF SUMMARY OF THE INVENTION

According to the present invention, a tool holder is provided in the form of a bar-like support or the like adapted to be mounted in a clamp in a machine tool or which could even form a part of the machine tool. The support member is provided with an angular notch at one end with longitudinal and transverse locating surfaces thereon and receivable in the notch is a block having cooperating locating surfaces for engagement with the surfaces in the notch while a clamp element is provided on one of the support member and block for fixedly connecting the block to the support member.

The clamp element forms the sole means of holding the block in the notch of the tool holder. The clamping element or means is carried by the support member and is receivable in a slotted portion of the block when the block is mounted in the notch of the tool holder. The clamp element has a head for clampingly engaging the block and is preferably a single screw which is threadedly engaged with the support member.

Preferably, a perforation or slotted portion is formed in the block from its upper portion through its lower side and has an upwardly facing shoulder portion thereon.

Cooperating elements of rib and groove means are used as the longitudinal and transverse locating means. The depth of interlock of the rib and groove means between the block and the tool holder is preselected such that the block can be removed from the support member without complete disengagement of the clamp element from the support member and, preferably, in the case of a single screw, by no more than three complete revolutions of the screw itself.

The exact nature of the present invention will become more clearly apparent upon reference to the following detailed specification taken in connection with the accompanying drawings in which:

BRIEF DESCRIPTION OF THE DRAWINGS

FIG. 5 is a plan view of the detachable block of the tool holder.

FIG. 6 is a perspective view looking at the block from the front and beneath the block.

FIG. 7 is a perspective view looking at the block from the rear and above and partly broken away.

DETAILED DESCRIPTION OF THE INVENTION

Figure 1:
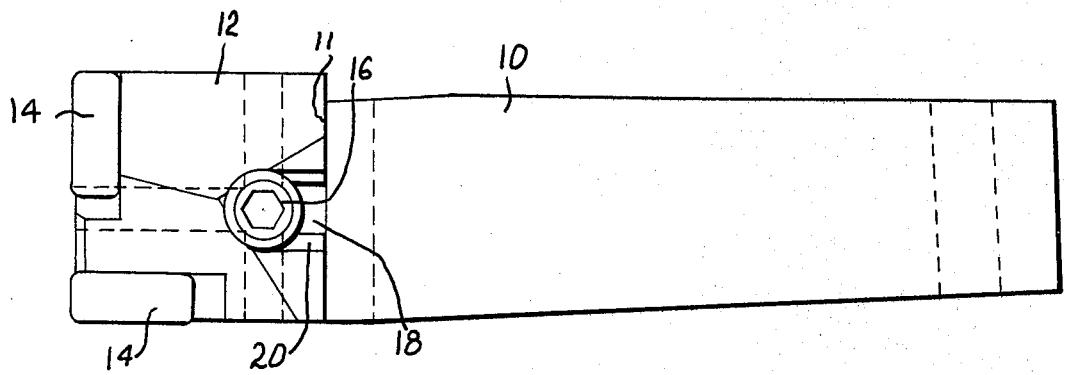
FIG. 1 is a plan view of a tool holder according to the present invention.

Referring to the drawings somewhat more in detail, FIG. 1 shows a tool holder which has a support member 10 having a block 12 seated in a notch 11 formed in one end of the support member 10. Block 12 has inserts 14 seated therein with the inserts 14 being held in block 12 by the normal type of pin arrangement known in the industry.

Block 12 is secured to support member 10 by single screw 6 which is disposed in a slotted portion 18 formed in block 12. Slotted portion 18 formed in block 12 is comprised of at least two slots of different sizes such that there is an upwardly facing shoulder 20 formed between the upper and lower surfaces of block member 12.

Figure 2:
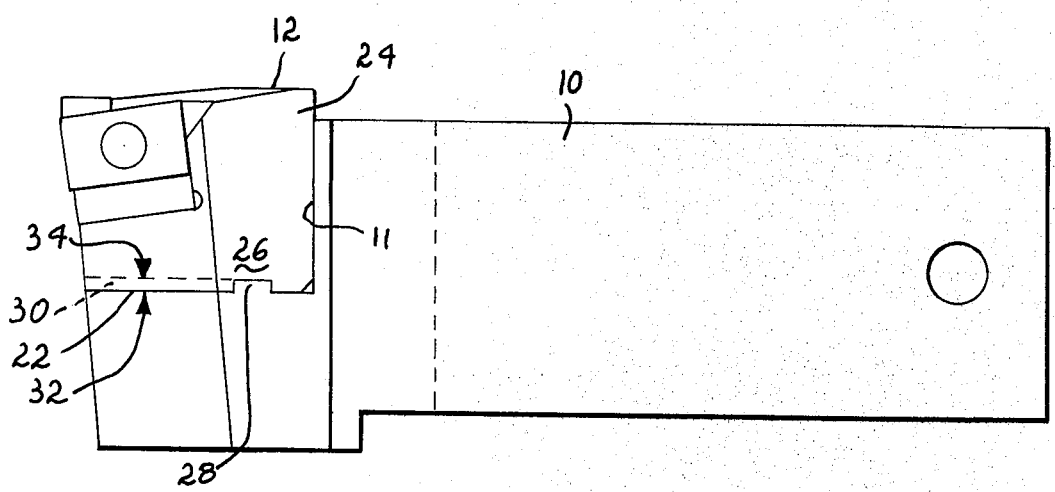
FIG. 2 is a side view of a tool holder according to the present invention.

Referring now to FIG. 2, which is a side view of the tool holder as described in FIG. 1, what is shown therein is the support member 10 with the block 12 mounted on one end thereof. Block 12 is shown seated in a forward notch which has a bottom wall 22 formed in at least one boundary of the notch in support member 10. Block 12 has an upper portion, generally designated at 24, and has a lower side, designated at 26, and has side walls surrounding the upper portion 24 and connecting with lower side 26.

Cooperating elements of rib and groove means are formed between the bottom wall 22 of the notch and lower side 26 of the block 12.

In the holder pictured in FIG. 2, the ribs 28 and 30 are upstanding from bottom wall 22 with the ribs 28 and 30 being formed at right angles one to the other. Grooves corresponding to the ribs 28 and 30 are formed in the lower side 26 of block 12 and are also formed at right angles one to the other. The ribs and grooves are very closely fitted so that substantially no longitudinal or lateral movement of the block 12 is permitted with regard to support member 10.

It can be seen from the drawing that the interengagement of the ribs and engagement between the cooperating elements of ribs and grooves indicated at 28 and 30 is kept to a minimum with this interengagement being referred to as the depth of interlock and generally indicated as the distance between the arrows 32 and 34 of FIG. 2.

Figure 3:
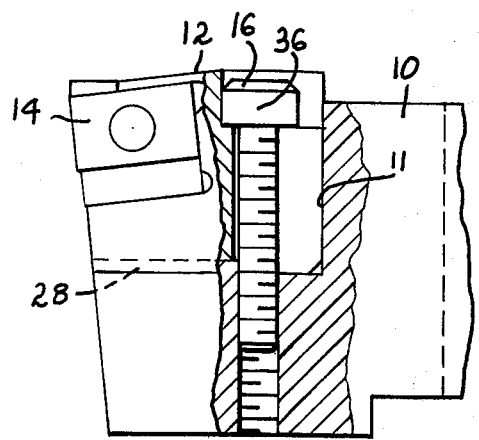
FIG. 3 is a fragmentary side view drawn partly broken away.

With reference to FIG. 3, shown therein is the block member 12 mounted in the notch of support member 10 with the preferred form of clamping being a single screw 16. As can be seen in FIG. 3 according to this invention, the clamping means is carried by the support member and is receivable in the slotted portion 18 of block 12 when block 12 is mounted in the notch formed on support member 10 and the clamping means has a head 36 for clampingly engaging said block member 12. As shown in FIG. 3, the preferred clamping means is the single screw 16 which has a threaded engagement with support member 10 and whose head 36 clampingly engages the upwardly facing shoulder 20 in slotted portion 18.

The tool holder as shown in FIG. 3 has the block member 12 firmly clamped in the notch of support member 10 and the cooperating elements of rib and groove means as indicated at 28 and 30 in FIG. 2 are fully interlocked. When in this position, cutting insert 14 may be used to remove metal from various workpieces.

When it is desired that either one or both of the inserts 14 are to be removed or changes, in some cases it is desired that the entire block member 12 be changed from support member 10 so that it may possibly cool before the inserts 14 are changed. In that event, it is desirable to interchange block member 12 with a fresh block member 12 having new inserts 14 mounted thereon.

Figure 4:
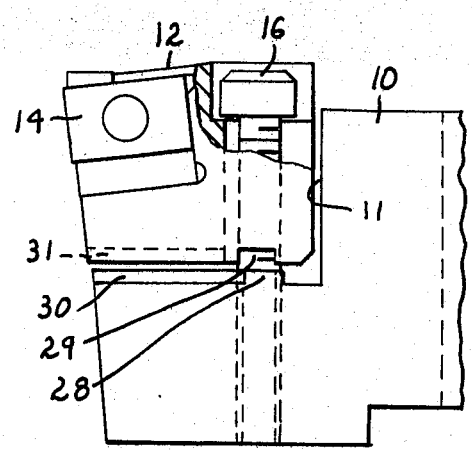
FIG. 4 is a view like FIG. 3 but showing the tool holder partly disassembled.

With reference to FIG. 4, what is shown therein is support member 10 with block member 12 in a position where it may be removed freely from support member 10. The single screw 16 has been rotated such that the head 36 has advanced upward of the bottom wall 28 but has still not been entirely disengaged from the support member 10. Rib 30 may plainly be seen in its fully disengaged position from groove 31 into which it mates.

Similarly, rib 28 may be seen fully disengaged from its corresponding groove 29 with which it also mates. With single screw 16 advanced upwardly to the position in FIG. 4, block 12 may then be lifted upwardly so as to disengage the cooperating elements of rib and groove means and they may be pulled forward and free of the support member 10.

With regard to the two positions of the block 12 shown between FIGS. 3 and 4, it is preferable that the pitch of the threads of the single screw 16 and the depth of the interlock between the cooperating elements of rib and groove means are chosen such that relatively few turns of a single screw 16 are necessary in order to remove the block 12 from the support member 10.

Preferably, the pitch of single screw 16 should be chosen such that no more than three rotations of single screw 16 would advance the head 36 upward in support member 10 a greater distance than the depth of interlock between the cooperating elements of rib and groove means between block 12 and the bottom wall 22 of the notch.

With reference to FIG. 5, shown therein is a view of the block member 12 looking down on the top surface 40 of upper portion 24. Inserts 14 are shown seated in different positions in insert receiving pockets of block 12. Block 12 is shown having generally side walls 42 forming a boundary of the top surface 40 of upper portion 24. Slotted portion 18 is formed in block 12 extending through the top face 40 of the upper portion 24 and the lower side 26 of block 12.

Each slotted portion communicates with one of the side walls 42 of block 12. Slotted portion 18 is formed of at least two slots of different dimensions, the first slot having a boundary 44 and the second slot having a boundary 46. The wider of the two slots having a boundary 44 is formed through the top face 40 and in the upper portion 24 of block 12. The second slot having a narrower boundary 46 than the boundary 44 is shown extending downward from the upper portion 24 through the lower side 26 of block 12.

When slotted portion is formed in this manner, an upwardly facing shoulder 20 is formed at the juncture of the first and second slots.

With reference to FIG. 6, cutting inserts 14 are shown mounted in insert receiving pockets of block 12. The lower face 48 is shown having grooves 31 and 29 formed therein. As can be seen in FIG. 6, the grooves 29 and 31 are at right angles one to the other and are generally sized so as to have a very close cooperating fit with the rib elements shown upstanding in the lower wall of the notch in support member 10.

With reference to FIG. 7, again, the block 12 is shown having cutting inserts 14 mounted in seats therein. Upwardly facing shoulder 20 is shown being formed at the juncture of the boundary of 44 and 46 of the slots which form the slotted portion 18 in block 12.

Modifications may be made within the scope of the appended claims.

What is claimed is:

1. In a tool holder comprising; a support member having a notch in one end with a bottom wall, a block receivable in said notch having a lower side, an upper portion and side walls, insert receiving pockets in said upper portion of said block, cooperating elements of rib and groove means on said bottom wall of said notch and said lower side of said block operable to interlock said block and support member against relative lateral movement and against relative fore and aft movement in at least one direction, a slotted portion formed in said block communicating with a side wall of said block and extending from said upper portion through said lower side of said block, and clamping means carried by said support member and receivable in said slotted portion when said block is mounted in said notch, said clamping means having a head for clampingly engaging said block, said clamping means forming the sole means for clamping said block on said support member.

2. A tool holder according to claim 1 in which said slotted portion is formed of at least two differently sized slots forming a shoulder facing upwardly from said lower side of said block.

3. A tool holder according to claim 1 in which said clamping means comprises a single screw threadedly engaged with said support member with said head engaging said upper portion of said block.

4. A tool holder according to claim 2 in which said head of said clamping means clampingly engages said shoulder in said block.

5. A tool holder according to claim 2 in which said clamping means comprises a single screw threadedly engaged with said support member with said head engaging said shoulder of said block.

6. A tool holder according to claim 1 in which said cooperating elements of rib and groove means have a preselected distance of interlock such that said block may be removed from an interlocking position with said support member without complete disengagement of said clamping means from said support member.

7. A tool holder according to claim 3 in which said cooperating elements of rib and groove means have a preselected distance of interlock such that said block may be removed from an interlocking position without complete disenagement of said single screw from said support member.

8. A tool holder according to claim 5 in which said cooperating elements of rib and groove means have a preselected distance of interlock such that said block may be removed from an interlocking position with said support member without complete disengagement of said single screw from said support member.

9. A tool holder according to claim 7 in which the pitch of the threads on said single screw is preselected such that no more than three complete rotations of said screw are necessary to disengage said block for an interlocking position with said support member.

10. A tool holder according to claim 8 in which the pitch of the threads on said single screw is preselected such that no more than three complete turns are necessary to disengage said block from an interlocking position with said support member.

* * * * *